United States Patent [19]

Guenthner et al.

[11] Patent Number: 4,594,659

[45] Date of Patent: Jun. 10, 1986

[54] METHOD AND APPARATUS FOR PREFETCHING INSTRUCTIONS FOR A CENTRAL EXECUTION PIPELINE UNIT

[75] Inventors: Russell W. Guenthner, Glendale; William A. Shelly, Phoenix, both of Ariz.; Gary R. Presley-Nelson, San Francisco, Calif.; Kala J. Marietta, Phoenix, Ariz.; R. Morse Wade, Sunnyvale, Calif.

[73] Assignee: Honeywell Information Systems Inc., Phoenix, Ariz.

[21] Appl. No.: 434,197

[22] Filed: Oct. 13, 1982

[51] Int. Cl.⁴ .............................................. G06F 9/28
[52] U.S. Cl. .................................................... 364/200
[58] Field of Search ............................... 364/200, 900

[56] References Cited

U.S. PATENT DOCUMENTS

| | | | |
|---|---|---|---|
| 4,208,716 | 6/1980 | Porter et al. | 364/200 |
| 4,325,120 | 4/1982 | Colley et al. | 364/200 |
| 4,332,010 | 5/1982 | Messina et al. | 364/200 |
| 4,399,507 | 8/1983 | Cosgrove et al. | 364/200 |
| 4,521,851 | 6/1985 | Trubisky et al. | 364/200 |
| 4,530,052 | 7/1985 | King et al. | 364/200 |

*Primary Examiner*—Gareth D. Shaw
*Assistant Examiner*—Daniel K. Dorsey
*Attorney, Agent, or Firm*—A. A. Sapelli; J. S. Solakian; A. Medved

[57] ABSTRACT

Method and apparatus for prefetching instructions for a pipelined central processor unit for a general purpose digital data processing system. A table is maintained for purposes of predicting the target addresses of transfer and indirect instructions based on past history of the execution of those instructions. The prefetch mechanism forms instruction addresses and fetches instructions in parallel with the execution of previously fetched instructions by a central execution pipeline unit of the central processor unit. As instructions are prefetched, the transfer and indirect prediction (TIP) table is checked to determine the past history of those instructions. If no transfers or indirects are found, the prefetch proceeds sequentially. If transfer or indirect instructions are found, then the prefetch uses information in the TIP table to begin fetching the target instruction(s).

The purpose of the prediction of target addresses is so that in the usual case instructions following a transfer can be executed at a rate of one instruction per pipeline cycle regardless of the pipeline depth or the frequency of transfers. Instructions are fetched two words at a time in order that the instruction fetch unit can stay ahead of the central execution pipeline. An instruction stack is provided for purposes of buffering double words of instructions fetched by the instruction fetch unit while waiting for execution by the central execution pipeline unit. The TIP table is updated based upon the actual execution of instructions by the central execution pipeline unit, and the correctness of the TIP table predictions is checked during execution of every instruction.

20 Claims, 11 Drawing Figures

Fig-5                                              ADP CPU PIPELINES

| | T0 | T1 | T2 | T3 | T4 | T5 | T6 | T7 | T8 | T9 | T10 | T11 | T12 | |
|---|---|---|---|---|---|---|---|---|---|---|---|---|---|---|
| IFI | 1,2 | 3,4 | 5,6 | 7,8 | 9,0 | 1 1,2 | 1 1 3,4 | 1 1 5,6 | 1 1 7,8 | 1 2 9,0 | 2 2 1,2 | 2 2 3,4 | 2 2 5,6 | 2 2 7,8 | |
| IFA | | 1,2 | 3,4 | 5,6 | 7,8 | 9,0 | 1 1 1,2 | 1 1 3,4 | 1 1 5,6 | 1 1 7,8 | 1 2 9,0 | 2 2 1,2 | 2 2 3,4 | 2 2 5,6 | I-FETCH UNIT ⎫ 10 |
| IFPC | | | 1,2 | 3,4 | 5,6 | 7,8 | 1 9,0 | 1 1 1,2 | 1 1 3,4 | 1 1 5,6 | 1 1 7,8 | 1 2 9,0 | 2 2 1,2 | 2 2 3,4 | |
| IFCS | | | | 1,2 | 3,4 | 5,6 | 7,8 | 1 9,0 | 1 1 1,2 | 1 1 3,4 | 1 1 5,6 | 1 1 7,8 | 1 2 9,0 | 2 2 1,2 | |
| IFET | | | | | 1,2 | 3,4 | 5,6 | 7,8 | 1 9,0 | 1 1 1,2 | 1 1 3,4 | 1 1 5,6 | 1 1 7,8 | 1 2 9,0 | |
| I | | | | | | 1 | 2 | 3 | 4 | 5 | 6 | 7 | 8 | 9 | |
| A | | | | | | | 1 | 2 | 3 | 4 | 5 | 6 | 7 | 8 | CENTRAL EXECUTION PIPELINE UNIT ⎫ 12 |
| PC | | | | | | | | 1 | 2 | 3 | 4 | 5 | 6 | 7 | |
| CS | | | | | | | | | 1 | 2 | 3 | 4 | 5 | 6 | |
| ET | | | | | | | | | | 1 | 2 | 3 | 4 | 5 | |
| E1 | | | | | | | | | | | 1 | 2 | 3 | 4 | |
| E2 | | | | | | | | | | | | 1 | 2 | 3 | EXTENDED EXECUTION OR RESULTS PIPELINE ~40 |
| E3 | | | | | | | | | | | | | 1 | 2 | |
| ETC. | | | | | | | | | | | | | | 1 | ⎫ 36 | t →

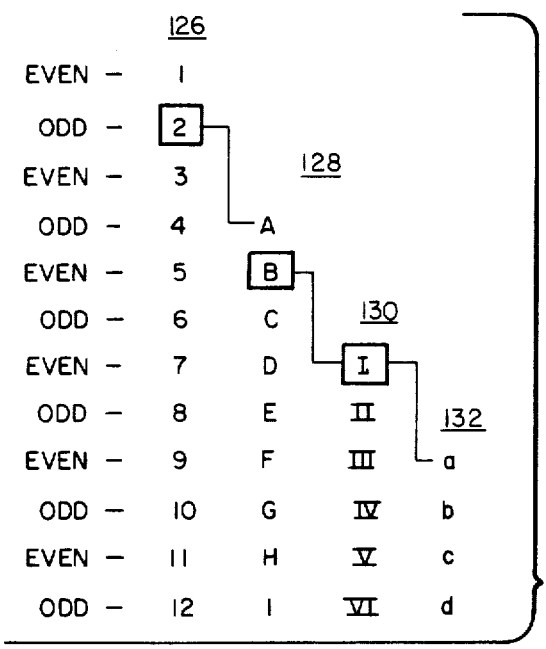

METHOD AND APPARATUS FOR PREFETCHING INSTRUCTIONS FOR A CENTRAL EXECUTION PIPELINE UNIT

CROSS-REFERENCE TO RELATED APPLICATIONS

The following copending concurrently filed applications relate to the present application and are incorporated herein by reference:

A. "Central Processor" invented by William A. Shelly and Leonard G. Trubisky application Ser. No. 06/434,122 filed Oct. 13, 1982, which issued as U.S. Pat. 4,521,851 on June 4, 1985;

B. "Method and Apparatus for Initiating the Execution of Instructions" invented by John E. Wilhite, William A. Shelly, Russell W. Guenthner, Leonard G. Trubisky, and Joseph C. Circello application Ser. No 06/434,196 filed Oct. 13, 1982, which issued as U.S. Pat. No. 4,471,432 Sept. 11, 1984;

C. "Collector" invented by Russell W. Guenthner, Gregory C. Edgington, Leonard G. Trubisky, and Joseph C. Circeflo application Ser. No. 06/434,129, filed Oct. 13, 1982; and D. "Distributor" invented by John E. Wilhite and William A Shelly application Ser. No. 06/434,126, filed Oct. 13, 1982.

All of the foregoing are assigned to the same assignee.

BACKGROUND OF THE INVENTION

1. Field of the Invention

This invention is in the field of synchronous central processors of large-scale, high-performance, general-purpose digital data processing systems. More particularly, this invention relates to method and apparatus for prefetching instructions for a multistaged or central execution pipeline unit (CEPU) of such a central processor.

2. Description of the Prior Art

To increase the performance of the central processors and of the data processing systems of which they are a part, many modifications and improvements have been incorporated into such processors. One such modification is the use of a high-speed cache unit located in the processor to minimize the time required to fetch operands and instructions. To further increase the performance of data processing systems, central processors are synchronized; i.e., a clock produces clock pulses which control each step of the operation of the central processor. Synchronization permits paralleling, overlapping, or pipelining the execution of instructions by dividing the process of executing each instruction into a number of sequential steps, with each instruction going through the same sequence of steps one after another. The result of pipelining is that one instruction will complete its passage through the CEPU at the completion of each clock period, assuming that there are no breaks in the sequence, or in the pipeline. In such central processors, the number of stages, or steps, defined as being the depth of the pipeline.

A pipelined central processor, in order to take maximum advantage of having such capabilities, requires that instructions to be executed, be available, or be prefetched, so that there is no delay caused by the CEPU having to wait for an instruction to be fetched before the pipeline can begin the process of execution of the instruction. Providing the central execution pipeline unit with an instruction prefetch unit is something that is not new to the art; however, there are certain problems with prior art instruction prefetch units. Such prior art instruction prefetch units will fetch instructions only along a given sequential path, or instruction stream. In a given sequential path, or instruction stream, the memory addresses of the instructions of that stream are sequential beginning with the initial instruction of the stream. The addresses of instructions of the stream will be incremented by a given amount, normally one or two, until such time as a branch instruction is encountered. When a branch instruction is encountered, the current instruction stream, or path, is broken, or terminated, and a new instruction stream or path is begun at an address, the target address, specified by the branch instruction.

With prior art prefetch units which can only prefetch instructions along a given instruction stream, at such time as an unconditional branch occurs there is a break in the central execution pipeline unit, and no instructions begin their passage through the steps of the pipeline until the address of the target instruction of the transfer instruction is determined and made available to the CEPU. The magnitude of the delay is a function of the number of steps or stages in the execution pipeline, typically from three to ten clock periods. After such a delay, the target instruction of the branch instruction is fetched and supplied to the central execution unit and operation of the CEPU proceeds until the next branch instruction is executed by the processor.

Another type of instruction which can cause a temporary interruption in the sequential execution of instructions is called an indirect instruction. In executing an indirect instruction, what otherwise would be the address of the operand of the operation to be performed by the instruction, is the address of another word, an indirect word, which indirect word is used in forming the address of the operand or of another indirect word. If the second indirect word contains the address of another word, this word may be either the address of an operand, an address that can be used to form the address of the operand, or the address of another or third indirect word, etc. After prefetching an indirect instruction, it is necessary for the prefetch unit, if it is to avoid breaking the pipeline of the central execution pipeline unit, to fetch the target indirect words and then to prefetch the following sequential instructions of the current instruction stream in which the indirect instruction is located.

BRIEF SUMMARY OF THE INVENTION

The present invention provides an improved method and apparatus for prefetching instructions for the central execution pipeline unit of a synchronous central processor of a general-purpose digital data processing system. The apparatus, an instruction fetch unit, includes an instruction counter register and a backup instruction counter register for storing cache addresses of a pair of machine words, instructions or operands. The central processor includes a set associative cache unit having directories and data arrays organized into columns and levels into which machine words are written and out of which such machine words are read. Instructions and indirect words read out of the cache unit are stored in an instruction fetch register and are then transferred from the instruction fetch register into an instruction stack. A transfer and indirect prediction (TIP) table, which also has a directory and a data array organized into columns and levels, is designed to have TIP words written into the data array and from which such TIP words are read. Each TIP word includes a prediction code representing that a corresponding instruction in the cache is a transfer instruction, an indirect instruction, or neither, and it is is a transfer or indirect then the cache address of the target word of each such instruction is provided.

The instruction fetch unit is an instruction fetch pipeline, which in its first stage increments the instruction counter register to form the cache address of the next pair of instructions of a given instruction stream. In the second stage, the cache addresses formed and stored in the instruction counter register in the preceding step are distributed to the cache unit directories and the TIP table directory. In the third stage or step, the cache directory is accessed for the real page number of the instruction pair and the directory of the TIP table is accessed to select any TIP table words written into the TIP table data array for the instructions of the addressed instruction pair. In the fourth stage, a pair of instructions is read from the level of the cache data array designated in the cache address, and the prediction code of any TIP word associated with these instructions is examined to determine if either or both, or none, of the instructions placed in the instruction stack is a transfer or an indirect instruction. The instructions so selected are stored into an instruction fetch register. The real page number of the instruction pair stored in the addressed column and level of the cache directory is stored in an instruction real page number stack register. In the fifth cycle, the instructions in the instruction fetch register are placed in the instruction stack.

If one of the instructions is a transfer instruction, the cache address of the target instruction, or the address of the target of the transfer instruction, is loaded into the instruction counter and that address of the target is the address of the initial instruction of the new, or next, instruction stream. If the instruction is an indirect instruction, the cache address of the target indirect word, an operand or another indirect word, is loaded only into the instruction counter register and not into the backup instruction counter register. The address in the backup instruction counter register which is the address of the next instruction pair of the then current instruction stream is then loaded into the instruction counter register during the next clock period. The next instruction to be transferred to the central execution pipeline unit is identified by pointers in an instruction stack linking stack which pointers are derived by control logic as instructions are placed in the instruction stack utilizing the prediction type code contained in the TIP table words identifying or indicating each transfer or indirect instruction. Such predictions are based on what happened when the same instructions were previously executed by the central execution pipeline unit.

The instructions stored in the instruction stack of the instruction fetch unit represent instructions of the current instruction stream and possibly one or more prefetched alternate instruction streams, as well as indirect words as predicted by TIP table words stored into the TIP table. The instruction fetch unit has the capability of supplying target instructions and target operands of indirect instructions to the central execution pipeline unit with the minimum or no delay to minimize the occurrence of breaks in the central execution pipeline unit. During prefetch, if the TIP table word for an instruction predicts that the instruction will be a successful transfer, or transfer-go, the instruction fetch unit will fetch the target of the transfer instruction and prefetch instructions of the instruction stream of which the target is the first. If the instruction executed is an indirect instruction, the instruction fetch unit will fetch the target of the indirect instruction after which the instruction fetch unit resumes fetching instructions of the current instruction stream. In the absence of a transfer-go or an indirect instruction, the instruction fetch unit continues fetching instructions sequentially of the current instruction stream and stores the instructions so prefetched into the instruction stack two at a time. The instruction fetch unit also resumes prefetching of instructions of the current instruction stream if a predicted transfer-go instruction turns out to be not a transfer, or is a transfer no-go, when it is executed in the central execution pipeline unit. The target of a transfer instruction and the target of an indirect instruction are available for processing by the instruction execution pipeline unit as soon as they are prefetched. Thus, any delay of the central execution pipeline unit, when executing transfer or indirect instructions which are not correctly predicted by the TIP table, is minimized.

It should be noted that the instruction fetch unit consults the TIP table words to determine if on the previous execution of a given instruction that instruction was a transfer-go or requires an indirect word or operand. The central execution pipeline unit updates the contents of the TIP table based on what actually happens as each transfer or indirect instruction completes its passage through the central execution pipeline unit.

It is, therefore, an object of this invention to provide an improved instruction fetch unit for a synchronous central processor unit.

It is another object of this invention to provide an instruction fetch unit which, based on history, predicts when a given transfer instruction is a transfer-go, and also predicts the target address of the transfer instruction; and begins prefetching instructions along the new instruction stream with the initial instruction being the target instruction of the executed transfer instruction, so that instructions of the new instruction stream are available to the central execution pipeline unit in sufficient time to avoid delaying or causing a break in the central execution pipeline unit.

It is yet another object of this invention to provide an improved instruction fetch unit in which the targets of transfer instructions and indirect instructions are prefetched to minimize the possibility of a break in the central execution pipeline unit.

It is yet another object of this invention to provide an instruction fetch unit which, in the event that the address of the predicted target of a transfer or indirect instruction is incorrect, the unit resumes prefetching of instructions of the then current instruction stream to minimize the possibility of additional breaks in the pipeline of the central execution pipeline unit.

BRIEF DESCRIPTION OF THE DRAWINGS

Other objects, features and advantages of the invention will be readily apparent from the following description of a preferred embodiment thereof taken in conjunction with the accompanying drawings, although variations and modifications may be effected without departing from the spirit and scope of the novel concepts of the disclosure and in which:

FIG. 5 illustrates the steps of the instruction fetch pipeline and the steps of the central execution pipeline unit;

FIG. 9 is a table defining the type codes of a TIP table word;

FIG. 10 is another schematical diagram of a set of instruction streams; and

FIG. 11 illustrates the contents of the instruction stack and of the link list stack for the instructions of the instruction streams of FIG. 10.

DESCRIPTION OF THE PREFERRED EMBODIMENT

Figure 1:
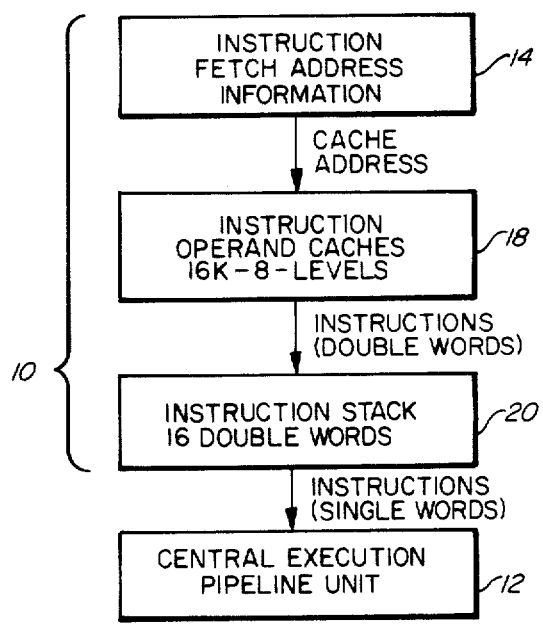
FIG. 1 is a block diagram illustrating the functions of the instruction fetch unit relative to the central execution pipeline unit.
Figure 3:
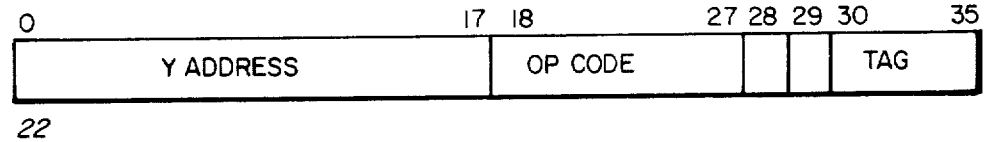
FIG. 3 illustrates the format of an instruction word.
Figure 2:
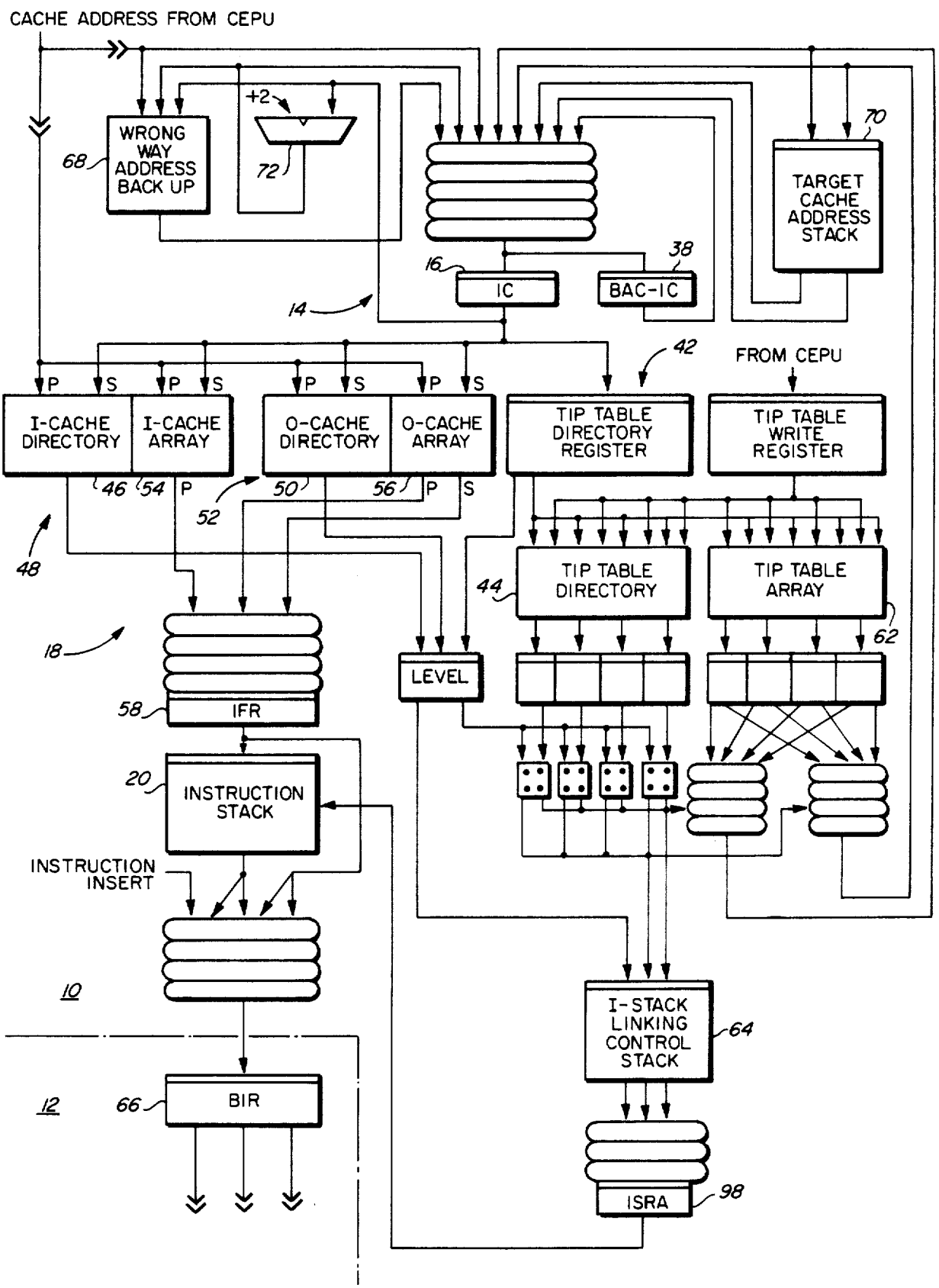
FIG. 2 is a schematic block diagram of the instruction fetch unit.

Referring to FIG. 1, the function of instruction fetch unit 10 is primarily to provide central execution pipeline unit 12 with instructions to be executed. Instruction fetch address formation logic 14 provides instruction counter register 16, which is illustrated in FIG. 2, with the address of a pair of instruction words, or an instruction pair, which instruction words are stored in cache unit 18. The pair of instruction words read out of cache unit 18 is placed in instruction stack 20 where prefetched instructions are stored until requested by central execution pipeline unit 12. It should be noted that instructions are read out of instruction stack 20 a single instruction at a time. The format of a basic instruction word 22 is illustrated in FIG. 3.

Figure 4:
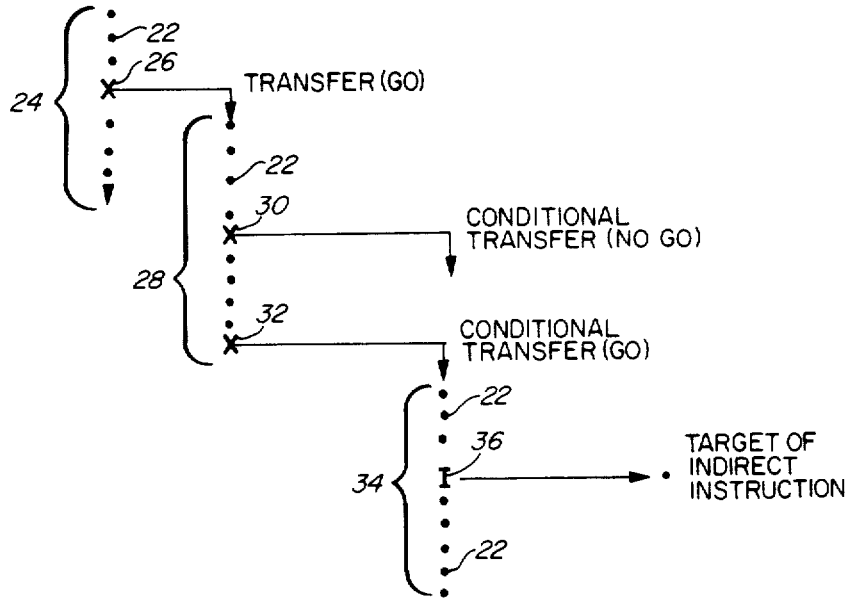
FIG. 4 is a schematic diagram of typical instruction streams.

As is illustrated in FIG. 4, a current instruction stream 24 in execution includes a plurality of instructions 22, one of which is transfer instruction 26, which causes a new instruction stream 28 to begin execution. In FIG. 4, each of the dots represents an instruction 22. Instruction sequence, or stream, 24 will proceed until transfer-go instruction 26 is executed. It should be noted that there are two types of transfer instructions, a conditional transfer instruction and an unconditional transfer instruction. An unconditional transfer instruction always transfers to, or goes to its target instruction, which starts a new sequence of instructions, the address of the target is formed by CEPU 12 utilizing the Y, or address field, bits 0–17 in the preferred embodiment, of unconditional transfer instruction 26 as a component. When a conditional transfer instruction such as instruction 30 of instruction stream 28 is executed, the condition which determines whether a transfer to a new instruction stream occurs or goes, or doesn's, may be the value stored in an indicator register, which value has been set by a prior instruction. If the condition is true, the transfer will be completed, a transfer-go, and, if not true, will be a transfer no-go. A common type of conditional transfer test is to load an operand from memory into the A register of the central processor. A subsequent transfer instruction will check whether the data in the A register is zero or not, for example. If it is zero and thus true, then the conditions for a transfer are met and the current instruction stream will transfer to a new instruction stream beginning with the target instruction of the transfer instruction, and central execution pipeline unit 12 will begin executing the new instruction stream.

In FIG. 4, transfer instruction 26 is an unconditional transfer instruction so that, upon the execution of instruction 26, execution of subsequent sequential instructions of instruction stream 24 will stop, and instructions of instruction stream 28 will begin execution in CEPU 12. Instructions 22 of instruction stream 28 to be executed thereafter will be in sequence, or sequential, until a subsequent transfer instruction is encountered, for example. In instruction sequence, or stream, 28, the first transfer instruction encountered is conditional transfer instruction 30. In this example, conditional transfer instruction 30 is assumed to be a no-go instruction. That is, the condition examined is not true and, therefore, a transfer to the target of conditional transfer instruction 30 does not occur. The execution of subsequent sequential instructions 22 of instruction stream 28 thus proceeds. Transfer instruction 32 in instruction stream 28 is a conditional transfer instruction in which a transfer to the target instruction occurs since the specified condition when tested is true, or is satisfied. Thus, conditional transfer 32 is a transfer-go. When instruction 32 is executed by CEPU 12, further execution of instructions 22 in stream 28 is terminated and a transfer to instruction stream 34 occurs with the first instruction of instruction stream 34 being the target of instruction 32. The address of the target of instruction 32 is formed by CEPU 12 using the Y field of conditional transfer instruction 32. Such a transfer is accomplished by loading the address of the target instruction into instruction counter register 16. Thereafter, the contents of register 16 are incremented by logic 14 to produce addresses of subsequent sequential instructions of instruction stream 34.

The final example illustrated in FIG. 4 is that of an indirect instruction 36. An indirect instruction is an instruction in which the address portion, Y, of instruction word 22 is the address of an indirect word in memory, or is used to form the address of such a word, which indirect words can contain the address of the operand of the indirect instruction or can be used to define the address of another indirect word, etc. There is no limit on the number of levels of indirection that can be used, the number being at the discretion of the programmer writing programs to be executed by the system. When an indirect instruction is encountered, instruction fetch unit 10 will provide the first target word of the indirect instruction to CEPU 12. If there are further levels of indirection, CEPU 12 will process the target indirect words; i.e., fetch the target indirect words from cache unit 18 or the random access memory of the data processing system, as is well known in the computer art, until such time as the operand of the indirect instruction is fetched.

Indirect instructions are processed by instruction fetch unit 10 in a manner very similar to that of a transfer instruction in that an indirect instruction will cause instruction fetch unit 10 to fetch the target indirect word by changing the cache address in the instruction counter register 16 to that corresponding to the cache address of the target word of the indirect instruction. As soon as IFU 10 has initiated the process of prefetching the target word from cache unit 18, instruction counter 16 is loaded with the address in backup instruction counter register 38, so that instructions subsequent to instruction 36 of instruction stream 34 will be fetched as is indicated in FIG. 4. As a result, the execution of instructions 22 in instruction stream 34 is resumed and will continue unti the next transfer instruction that is a transfer-go or an indirect instruction is encountered.

Referring to FIG. 5, instruction fetch unit 10, in the preferred embodiment, has five stages, or it is a prefetch pipeline having five prefetch cycles, IFI, IFA, IFPC, IFCS, and IFET. Upon the completion of these five cycles, prefetched instructions are normally stored in I stack 20. CEPU 12 also has five stages, or cycles, through which each instruction flows or passes. The five stages, or cycles, are identified as I, A, PC, CS, and ET. The central processor, of which instruction fetch unit 10 and CEPU 12 are components, is also provided with a plurality of extended execution units in which instructions that require more than one clock period to complete are executed. In FIG 5. these cycles are identified as being in or comprising results pipeline 40 which extends beyond the last cycle, or stage, ET of central execution pipeline unit 12. In CEPU 12, "I" is the instruction cycle, "A" the address cycle, "PC" the paging and cache access cycle, "CS" is the cache select cycle, and "ET" is the execute or transmit cycle. The names and identifying acronyms of the cycles of IFU 10 are analogous to those of the CEPU 12, except that in prefetch unit 10 each cycle identifier is preceded by "IF" standing for "instruction fetch".

Figure 6:
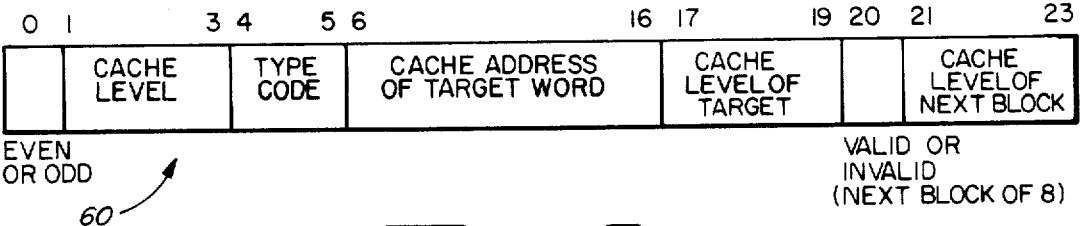
FIG. 6 illustrates the format of a TIP table word.

During IFU 10's IFI cycle, instruction counter register 16 is incremented by two. In the IFA cycle, the contents of instruction counter 16 are distributed to the cache unit 18 and to TIP table 42 which are illustrated in FIG. 2. In the IFPC cycle, directory 44 of TIP table 42, directory 46 of I cache 48, and directory 50 of operand cache 52 are accessed. I cache 48 and operand cache 52 comprise cache unit 18. During the IFCS cycle, an instruction pair is selected from one of the four cache levels of I cache data array 54 of operand cache data array 56. This instruction pair is saved in instruction fetch register (IFR) 58 and the response, up to two TIP table words 60 from TIP table data array 62, is checked to see of either of the instructions placed in instruction fetch register 58 is recorded in TIP table 42 as a transfer-go or as an indirect instruction. In the fifth prefetch cycle, IFET, the instruction pair in instruction fetch register 58 is placed in the instruction stack 20. Should the type code, bits 4 and 5 of each TIP word 60, the format of which is illustrated in FIG. 6, read out of TIP table array 62 for the instructions read out of either cache array 54, 56 indicate that either of the instructions is a transfer-go or an indirect instruction, then instruction counter 16 will have loaded into it the cache address of the target, bits 6–16 of TIP table word 60 of the corresponding instruction. Several clock periods T are required after the cache address of a transfer-go instruction is loaded into instruction counter 16 to obtain the TIP table entry 60 and to load that address into instruction counter 16. As a result, an additional, two or more, extra double-word pairs of the current instruction stream will be read out of cache unit 18 and stored into instruction stack 20 before IFU 10 begins fetching instructions of the new instruction stream.

If a predicted transfer-go turns out on execution by the central execution pipeline unit 12 to be a transfer no-go instruction, the extra double-word pairs of the current instruction stream are available in instruction stack 20 for use by CEPU 12. Pointers in I stack linking control stack 64 point to the next instruction to be read out of instruction stack 20 to maintain the proper sequence of instructions even when a predicted target of a tranfer or indirect instruction turns out to be incorrect when that instruction is executed by CEPU 12.

During the IFET cycle, one of the instructions in the instruction fetch register 58 can be transmitted directly to the basic instruction register 66 of CEPU 12 bypassing instruction stack 20 if that instruction is the next instruction to begin execution in or to start proceeding through the steps, or stages, of CEPU 12. If neither of the instructions in the instruction fetch register 58 is needed immediately by the CEPU 12, these instructions are stored into I stack 20.

One thing that should be noted concerning FIG. 5 is that IFU 10 is prefetching instructions two instructions at a time, while the CEPU 12 is processing instructions a single instruction at a time. Instruction fetch pipeline unit 10, therefore, prefetches instructions at a faster rate than CEPU 12 executes instructions. IFU 10 has the time, or ability, to prefetch a sufficient number of instructions including those of the current instruction stream as well as any new instruction streams or indirect words so that CEPU 12 will not be delayed while waiting for IFU 10 to make available instructions for CEPU 12 to execute.

As pointed out above, it normally takes several clock periods T after a transfer-go or an indirect instruction is fetched by IFU 10 to load into instruction counter 16 the address of the first instruction of the new stream, so that IFU 10 will continue to prefetch instructions of the current instruction sequence, or stream, to pull two or more instruction pairs, for example, and load them into I stack 20 before beginning the process of prefetching instructions of the new instruction stream. If a transfer instruction is predicted to be a transfer-go and it is not a transfer-go, there are stored in instruction stack 20 up to eight instructions along the transfer no-go path of the then current instruction stream. These instructions are available for transmission to CEPU 12 so that CEPU 12 does not have to wait for IFU 10 to catch up to where it should have been if the decision on the transfer-go instruction had not been wrongly predicted by the entry in TIP table 42.

Referring to FIG. 2, instruction counter register 16 holds the cache address of the next pair of instructions of a current instruction stream. The cache address, in the preferred embodiment, is the lower order 11 bits of the 26-bit physical address of the instruction in system memory. The physical address is the actual address of an instruction, or operand, in the memory of the system. The cache address can be provided by CEPU 12, or it can be obtained from wrong way address backup stack 68, from backup instruction counter register 38, or from TIP table data array 62, either directly or from target cache address stack 70. When the instruction stream is proceeding normally; i.e., sequentially, the cache address of the instructions in I.C. register 16 is applied to adder circuit 72 where it is incremented by two to form the cache address of the next pair of instructions. This incremented address is then loaded into the instruction counter register 16. Generally, the contents of backup instruction counter register 38 are the same as those in instruction counter register 16.

I stack linking control stack 64 contains pointers based on information derived from TIP table words 60 to identify the next instruction that is to be transmitted from instruction stack 20 to BIR register 66 of CEPU 12. The instructions that are read out of I stack 20 are read out at a rate of not more than one for each clock period.

Figure 7:
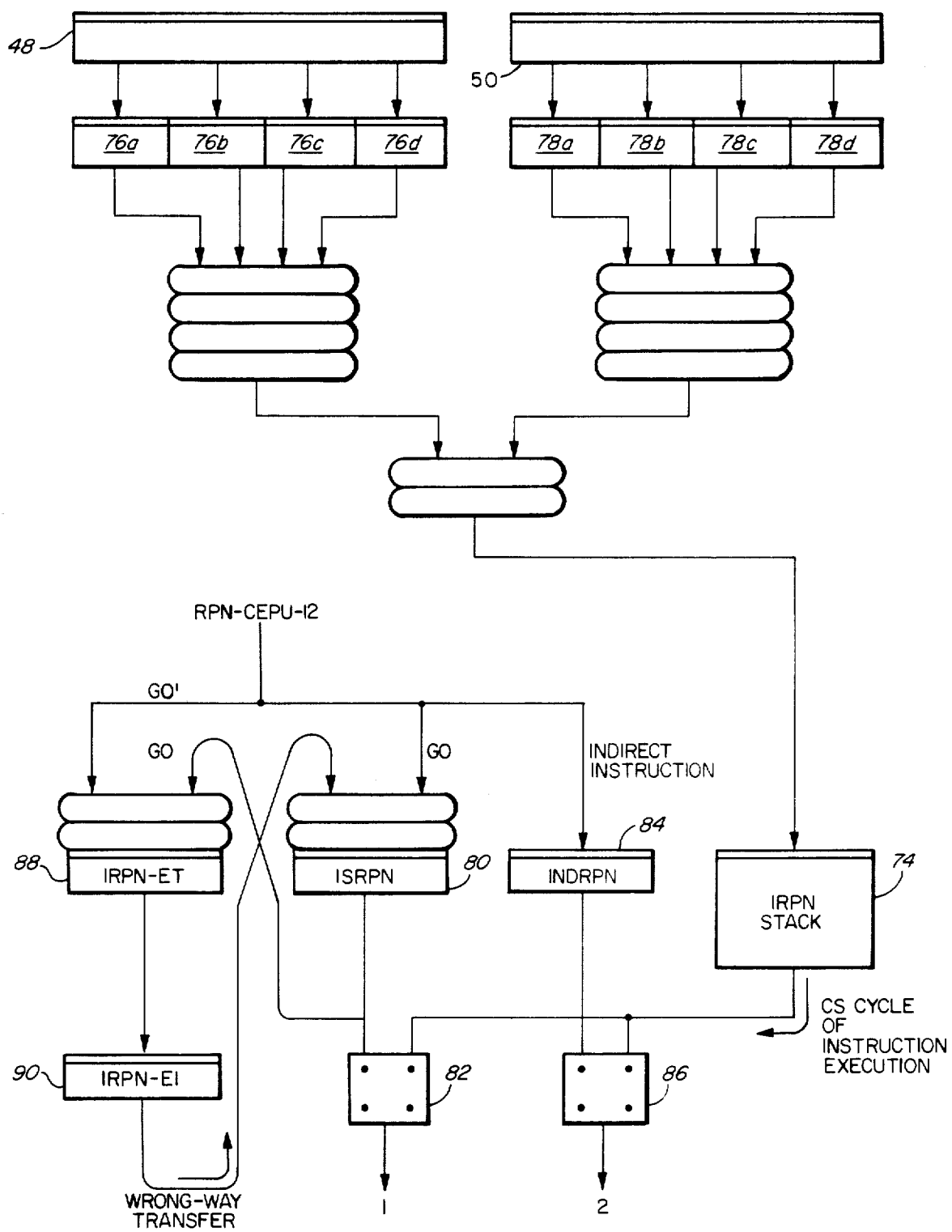
FIG. 7 is a block diagram showing additional details of the instruction fetch unit and particularly those relating to verifying that the correct instructions have been transferred to the central execution pipeline unit.

The real page number (RPN) of the instruction pair whose cache address was in I.C. register 16, whether obtained from I cache directory 48 or operand cache directory 50, is saved in IRPN stack 74, illustrated in FIG. 7. Four registers 76a, b, c, and d, which correspond to the four levels of each column of I cache directory 48, and four registers 78a, b, c, and d, which correspond to the four levels of each column of operand cache directory 50, hold the real page numbers of the instructions. The real page numbers of instructions loaded into a given level of I stack 20 are written into the corresponding level of IRPN stack 74. Similarly, wrong way address backup stack 68 and I stack linking control stack 64 also have 16 levels.

The function of the circuit illustrated in FIG. 7 is to verify that the address of each instruction, as it is being executed by the CEPU 12, is correct. This is accomplished by comparing the instruction stream real page number (ISRPN) in register 80 which is received from CEPU 12 for each transfer instruction as it completes its PC cycle in CEPU 12 with the real page number stored in IRPN stack 74 when that instruction was placed in I stack 20 by IFU 10. Thus, is the CS cycle of CEPU 12, the real page number (RPN) of the instruction in the CS cycle of CEPU 12 is read out of instruction real page number stack 74 and is compared with that in instruction stream real page number register 80 by comparator 82. If they compare, the instruction is deemed to be correct; if they do not compare, the instruction is deemed to be in error.

If the instruction is an indirect instruction, then the real page number of the target of the indirect page number as developed by CEPU 12 will be stored in INDRPN register 84. The indirect real page number in register 84 will be compared with that of the target stored in IRPN stack 74 by comparator 86. In either case, if either of the comparators 82, 86 does not indicate a comparison, then the instruction is improper. If the instruction in the CS cycle of CEPU 12 was predicted to be a transfer-go, and CEPU 12 when executing it determines that it is a transfer no-go, the no-go real page number will be loaded into IRPN-ET register 88 from CEPU 12 during the ET cycle. On the next cycle, this correct real page number will be loaded into register IRPN-El 90 and from there it will be loaded into ISRPN register 80. The function of the circuit, including registers 88 and 90, is to make certain that the real page number in ISRPN register 80 is always correct. This circuit also assures that the indirect real page number in register 84 is also always correct.

If TIP table word 60 for a given instruction predicts a transfer-go and in fact the transfer is a no-go, then the no-go path or the wrong way address, the address of the current instruction stream is obtained from wrong way address register 68 and loaded into I.C. register 16. Each time that a TIP table word 60 for a given instruction predicts a transfer-go, the cache address of the last instruction fetched from the current instruction stream will be stored in wrong way address backup register 68 in the level of register 68 corresponding to that in which the corresponding instruction was stored in instruction stack 20. When a wrong prediction of a transfer-go or indirect instruction occurs, the address from the level in wrong way address backup register 68 corresponding to that of the wrongly predicted instruction in instruction stack 20 will be loaded into instruction counter 16 and the process of incrementing the now correct address in instruction counter 16 will resume. Up to eight instructions of the current instruction stream can be made available from instruction stack 20, as was pointed out above, so that the wrong way address may well have been incremented several times before being loaded into the instruction counter 16 to resume the original or current instruction stream. If the target cache address as predicted by a TIP table word 60 is incorrect, then the correct address will be generated by CEPU 12 and the cache address portion, the lower order 11 bits, will be directly loaded into instruction counter register 16 so that IFU 10 can resume fetching instructions of the new instruction stream as quickly as possible. The reason for these recovery mechanisms is that whether a transfer is a go or no go and if a go, whether or not the address was predicted correctly is not determined by CEPU 12 until its ET cycle. Thus, there may be several instructions in CEPU 12 behind a transfer instruction which began execution wrongly. All instructions subsequent to an instruction wrongly predicted by TIP table 42 are canceled by CEPU 12 and the pipeline backed up and restarted along the correct path.

Figure 8:
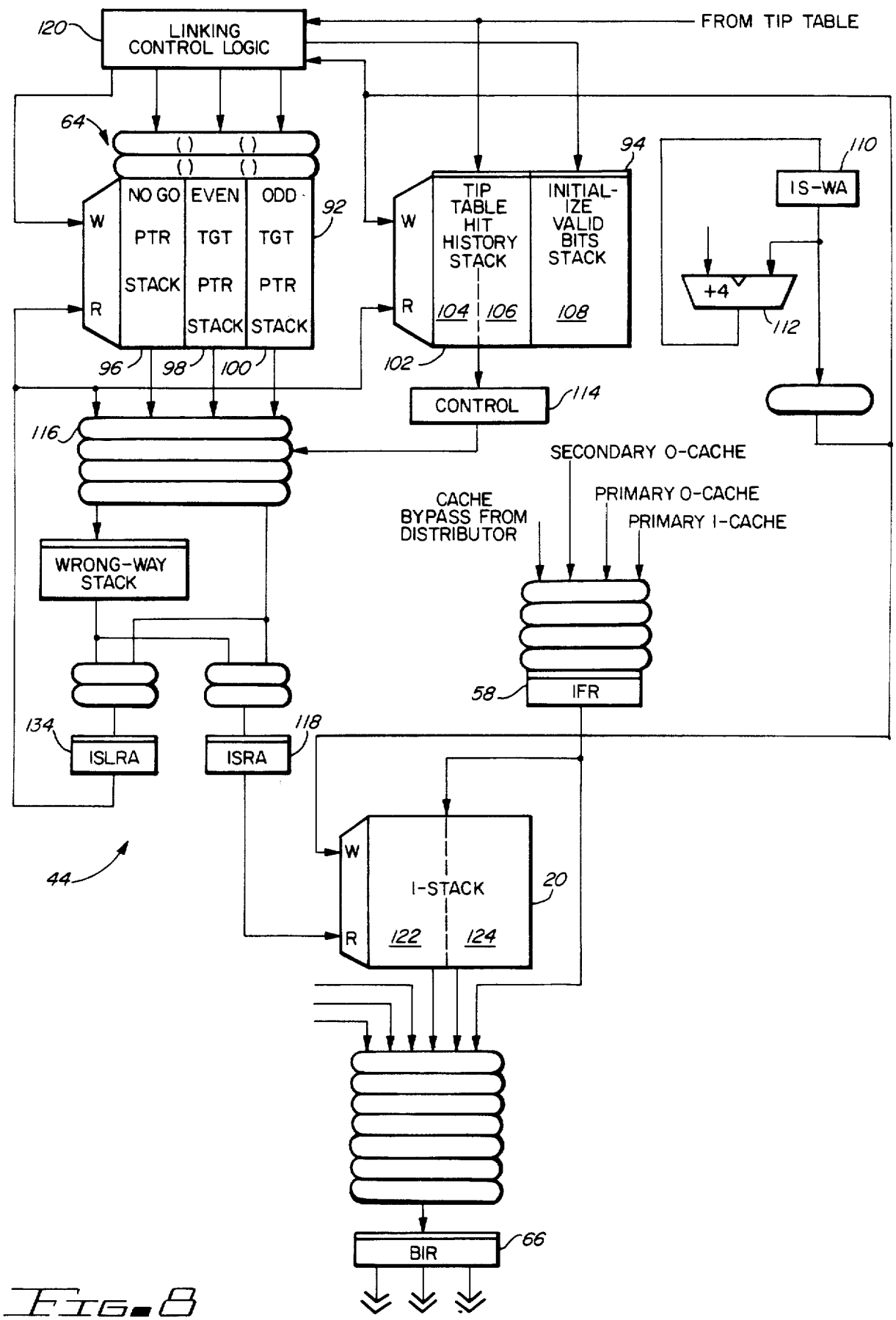
FIG. 8 is a schematic block diagram of the instruction stack linking control stack.

In FIG. 8, there is disclosed details of I stack linking control stack 64. Stack 64 can be considered as being divided into two portions, link list stack 92 and TIP table history stack 94. Each of these stacks also has 16 levels. Link list stack 92 is divided into three columns, no-go pointer column 96, even target pointer column 98, and odd target pointer column 100. Each pointer in the preferred embodiment consists of five bits. Hit history column 102 of stack 94 is four bits wide, with two bits forming hit history even row 104 and the remaining two bits forming odd hit history row 106. There are thus two hit history bits, or type codes, for each instruction in a given level of I stack 20. FIG. 9 is a table which defines the significance or meaning of each of the type codes. The initialized valid bit column 108 has one bit which when true, or a logical one, means that all the data in that level of columns 96, 98, 100 and 102 are valid.

The address of instructions in I stack 20, particularly their level and whether they are odd or even, is a five-bit binary number constituting the pointers in columns 96, 98, and 100. The I stack write address for the next instruction to be written into I stack 20 is stored in instruction stack write address (ISWA) register 110, which address is incremented once per each instruction pair by adder 112. The writing of instructions into I stack 20 is on a round-robin basis. The function of I stack link control stack 64 is to identify the next instruction in I stack 20 that is to be read out of stack 20 and into BIR register 66 of CEPU 12 in response to a request from CEPU 12. For the instructions in a given level of I stack 20, there is an entry, or pointer, in at least one of the columns 96, 98, 100 of stack 92, which points to, or identifies, the address, level and whether odd or even, of the next instruction to be read out of I stack 20. A pointer in a given level of no-go pointer column 96 points to the level of the next instruction pair to be read out of I stack 20 if the current instruction stream is continued or if a conditional transfer instruction predicted to be a transfer-go turns out to be a transfer no-go. A valid pointer in a given level of even target pointer column 98 will point to or identify the level and the column in I stack 20 in which the target of an even numbered instruction is stored. A pointer in odd target pointer column 100 will identify the level and column in instruction stack 20 in which the target of an odd-numbered T/I instruction is stored in I stack 20. When a conditional transfer instruction is executed, it can, as pointed out above, be a transfer no-go; even if on its previous execution it was a transfer-go. In such a case, the next instruction is the next sequential instruction in the current instruction stream which is identified or pointed to by the no-go pointer in the corresponding level of column 96. In such a situation, only the no-go pointer is used to point to or identify the location of the next sequential instruction of the current instruction stream in instruction stack 20.

TIP table history column 102, particularly rows 104 and 106, provided information based on prior history; namely, bits 4 and 5 of a TIP table word 60 for each T/I instruction stored in I stack 20, to permit control circuit 114 to select which one of the set of switches 116 is enabled so that the proper pointer from link list stack 92 is transmitted to I stack read address register 118. TIP table history stack 102 like stack 20 has 16 levels and there is an entry of two bits for each word of each pair of instructions in the corresponding level of I stack 20. These two bits, or type code, identify whether their coresponding instruction is a transfer or an indirect instruction.

TIP table words 60 are prepared by CEPU 12 when an instruction is found to have been incorrectly predicted by its TIP table word 60 when that instruction is executed by CEPU 12. All instructions when first placed in cache unit 18 are predicted to be no-go; i.e., the current instruction stream continues. As a new block of eight instructions, in the preferred embodiment, is brought into cache unit 18, any TIP table words 60 associated with the block of instructions cleared from cache unit 18 are cleared from TIP table 42. CEPU 12 prepares a TIP table word 60 and stores it in TIP table 42 only if the assumption that an instruction is a no-go or if the TIP table prediction for an instruction reflected by the presence of a TIP table word 60 in TIP table 42 is found to be incorrect when that instruction is executed by CEPU 12. This occurs when a transfer-go instruction is executed for the first time subsequent to its having been brought into cache unit 18, for example, or when an instruction predicted to be a transfer-go by its corresponding or associated TIP table word 60 is found to be a no-go when it completes execution in CEPU 12.

If neither of the instructions in a given level of the I stack 20 is predicted to be a transfer-go or an indirect instruction, no TIP table word 60 for those instructions is written into TIP table 42, and, when these instructions are read out of cache unit 18, the corresponding entries placed in hit history column 102; i.e., the two-bit codes, in rows 104 and 106 for that level, will be the binary number 11. These signals cause control logic 114 to gate, or enable, switch 116 so that the no-go pointer from the no-go pointer column 96 for that level is written into the I stack read address register 118, which selects the next sequential instruction to be read out of I stack 20 and to be written into basic instruction register 66 of CEPU 12. If TIP table history column 102 predicts that an instruction in the same level and column of I stack 20 is a transfer-go or indirect instruction, pointer logic 120 writes a pointer into column 98 or 100 identifying the level in I stack 20 of the target, as well as whether the target is in even column 122 or odd column 124 of I stack 20. The pointer to the target is written into the even column 122 by I stack linking control logic 120 if the instruction is an even-numbered instruction in its instruction stream or sequence and into the odd column 124 if the instruction is an odd-numbered instruction. Four bits of each pointer identify uniquely one of the 16 levels and the fifth identifies whether the target is in even column 122 or odd column 124.

The initialized valid bit in each level of column 108 of stack 94 is an implementation detail because timing is such in the preferred embodiment that there may not be time to initialize all the bits of a given level of stacks 92 and 94, the reason being that they are being read and written into simultaneously. To prevent error, the initialized bit is reset by logic 120 to a zero, in the preferred embodiment, to identify that none of the pointers in a given level of the stack 64 is valid and set to a logical one when the pointers and hit history stack entries for that level are valid and thus can be used. Instructions, or indirect words, are read out of I stack 20 one word at a time with the timing being controlled by the CEPU 12. IFU 10, however, determines which instruction is read out of I stack 20 in response to a request from CEPU 12.

In FIG. 10, there are illustrated several sequences of instructions, or instruction streams. In FIG. 11, there is illustrated the location in instruction stack 20 of the instructions of the instruction streams of FIG. 10, the contents of TIP table history column 102 and of the corresponding pointers in columns 96, 98, and 100 of stack 92. Instruction streams 126, 128, 130, and 132 include examples of transfer and indirect instructions to facilitate the explanation of the function of the invention and particularly of I stack linking control stack 64. The instructions of instruction stream 126 are identified as instructions 1, 2, 3, 4, 5, 6. Instruction 2 is an odd-numbered instruction and is a transfer-go instruction. The target of instruction 2 of instruction stream 126 is instruction A of instruction stream 128. This is known because on the previous execution of instruction 2 of instruction stream 126 it was a transfer-go instruction whose target was instruction A of instruction stream 118. Instruction 2 is written into odd column 124 of I stack 20 in level 0. Target instruction A is written into level 3, in odd column 124 of instruction stack 20, because it is identified as being, or is, an odd-numbered instruction. Linking control logic 120 writes into level 0 of column 100 the pointer 3 O which points to the level in instruction stack 20 in which the target A of instruction 2 is written. The letter O in level column 100 stands for odd to precisely identify the location of target A of instruction 2 in I stack 20; i.e., in level 3 of odd column 124. The pointer 3 O, for 3 odd, is written into the odd target pointer column 100 since instruction 2 is designated as being an odd-numbered instruction. In hit history column 102 in odd row 106, type code 01 denotes that instruction 2 was a transfer-go the previous time it was executed. Bits 6–9 target instruction A. Type code 11 which is written into the zero level of even row 104 of hit history column 102 represents that instruction 1 of instruction stream 116 is not predicted to be a transfer or an indirect instruction so that the pointer in column 96 level zero points to level 1 of I stack 20 as being the location in I stack 20 where the next pair of instructions of the current instruction stream is stored. It should be noted that instructions 3, 4, 5, and 6 of initial instruction stream 116 are stored in levels 1 and 2 of I stack 20. These instructions are available for use if instruction 2 is determined to be a no-go when executed by CEPU 12. Thus, after instructions 1 and 2 are read out of I stack 20, the next instruction to be read out of I stack 20 is instruction A of instruction stream 128 which is stored in level 3 of odd column 124 as predicted by the pointer in level zero of odd target pointer column 100 of stack 92.

The hit history table entry in level 3 of row 106 of hit history column 102 for instruction A is a type code 11, a no-go code so that instruction A is not predicted to be a transfer-go or indirect instruction. Therefore, the sequential execution of instructions in instruction stream 128 is pursued causing the next instruction to be read out of instruction stack 20 to be instruction B. Instruction B is stored in even column 122 at level 4 of I stack 20, as indicated by the no-go pointer 4 in level 3 of no-go column 96. Instruction B of instruction stream 128 which is stored in level 4, column 122, is predicted to be a transfer-go instruction by the type code 01 written into level 4 of row 104 of hit history column 102. The target of instruction B is predicted to be instruction I of instruction stream 130. Instruction I, the predicted target of instruction B, is stored in level 6 of column 122. The pointer to instruction I is written into level 4 of even target pointer column 98, namely, 6E to identify level 6 of even column 122 of I stack 20. It should be noted that prefetch unit 10 will have fetched instructions D and E of instruction stream 128 and stored them in level 6 of I stack 2 before it fetches instructions I and II of stream 130 and stores them in level 6 of I stack 20. The type code for instruction I in level 6 of row 104 is type code 10 which signifies that instruction I is predicted to be an indirect instruction. The target of instruction I is machine word (a) in instruction stream 132. Word a is stored into level 8 of even column 122 of I stack 20 because instruction a is denoted as an even-numbered instruction. Since instruction I is an even-numbered instruction, the pointer 8E is written into level 6 of column 98. When an indirect instruction such as I of instruction stream 130 is fetched and its target has been fetched, written into I stack 20, and subsequently has been written into BIR register 66, the next instruction to be read out of I stack 20 is the next sequential instruction of current instruction stream 130, which is instruction II. When an indirect instruction such as I is read out of I stack 20, control circuit 120 will, upon the loading of the I stack link address of the target of the indirect word "a" into I stack read address register 118, prevent that address from being loaded into the I stack link address register 134 so that register 134 will hold the I stack address of indirect instruction I of instruction stream 130. It should be noted that, in level 7 of no-go column 96, logic 120 places a pointer which points to level 9 in which is located 120 places a pointer which points to level 9 in which is located the next pair of instructions of instruction stream 130; namely, instructions V and VI.

From the foregoing, it is believed obvious that the advantages of applicant's invention; namely, that of prefetching targets of branch instruction and target words of indirect instructions, have been achieved with the result that the central execution pipeline unit of the system is not forced to wait until instructions along new instructions streams or the targets of indirect instructions have been fetched and that branches can be nominally executed at a one-cycle pipeline rate, one instruction per clock period T, which significantly increases the throughput of the system as an entity.

What is claimed is:

1. An instruction fetch unit for a central execution unit comprising:
   instruction counter register means for storing an address of a pair of instructions;
   cache means into which instructions and operands are written and out of which instructions and operands are read;
   instruction stack means for storing instructions awaiting execution;
   transfer and indirect prediction table means into which are recorded TIP table words including a target address of transfer and indirect instructions;
   means for incrementing an address stored in the instruction counter register means to form the address of the next pair of instructions of an instruction stream;
   means for distributing the address of the pair of instructions stored in the instruction counter means to the cache means and the transfer and indirect prediction table means;
   means responsive to receipt of the address distributed for accessing the cache means and the transfer and indirect prediction table means to determine if a pair of instructions having such address is stored in the cache means and if TIP table words for the addressed instructions are stored in the transfer and indirect prediction table means;
   means for selecting the addressed pair of instructions from the cache means and for storing the selected addressed instructions into an instruction fetch register;
   means for selecting the TIP table words for the addressed instructions from the transfer and indirect prediction table means and for checking the selected TIP table words to determine if the addressed instructions are transfer or indirect instructions and the target addresses thereof;
   means for placing the pair of instructions in the instruction stack means;
   means for loading into the instruction counter register means the address in the TIP table word for an instruction recorded in the TIP table word as being a transfer or indirect instruction; and
   means responsive to data in the TIP table word for each instruction for predicting which instruction in the instruction stack is the next instruction to be executed by the central execution unit.

2. An instruction fetch unit as defined in claim 1 in which the address stored in the instruction counter register means is a cache address.

3. An instruction fetch unit as defined in claim 2 in which the cache means includes instruction cache means for storing instructions.

4. An instruction fetch unit as defined in claim 3 in which each TIP table word includes a type code.

5. An instruction fetch unit for a synchronous central processer having clock periods of a predetermined length of time and a central execution pipeline unit comprising:
   instruction counter register means and a backup instruction counter register means for storing cache addresses of a pair of words;
   set associative cache means having directory means and data array means organized into columns and levels into which words are written and out of which words are read;
   instruction fetch register means for storing instructions;
   instruction stack means for storing instructions and indirect words;

instruction real page number stack means for storing real page numbers of addressed instructions read out of the cache directory means;

transfer and indirect prediction (TIP) table means having directory means and data array means organized into columns and levels, into which TIP words are written and from which TIP words are read, each TIP word including a prediction code representing that a corresponding instruction word is a transfer instruction, an indirect instruction, or neither and the cache address of the target word of each such instruction;

five-stage instruction fetch pipeline means for;

(1) incrementing in the first stage the instruction counter register means to form the cache address of the next pair of instructions of a given stream of instruction, (2) distributing in the second stage the cache addresses in the instruction counter in stage 1 to the cache means and TIP table directory means, (3) accessing in the third stage the cache directory means for the real page number (RPN) of the instruction pair and accessing the directory means of the TIP table means to determine if a TIP word has been written into the TIP table data array means for either or both of the instructions of the instruction pair, (4) selecting during the fourth stage a pair of instructions from the cache data array means and the RPN of said instruction pair and storing the RPN in the instruction real page number stack means and storing the instructions in the instruction fetch register address means, (5) loading into the instruction stack means during the fifth stage the instructions placed in the IF register during the fourth stage, examining the prediction codes of any TIP words read from the TIP table for the instructions loaded into the instruction stack to determine if they are transfer or indirect instructions, loading the cache address of the target word of the TIP word into the instruction counter register means and the backup instruction counter means; however, if the instruction is an indirect instruction, the cache address of the target word is loaded only into the instruction counter register means and not into the backup instruction counter register means and the cache address in the backup instruction counter instruction counter register means is loaded into the instruction counter register means during the next clock period; and means for determining the next instruction to read out of the instruction stack by the central pipeline unit.

6. An instruction fetch unit as defined in claim 5 in which the cache address includes the level in the cache means.

7. An instruction fetch unit as defined in claim 6 in which the cache means is organized into an operand cache means and an instruction cache means and in which the cache address specifies one of said two cache means.

8. An instruction fetch unit as defined in claim 7 in which the means for determining the next instruction to be read out of the instruction stack includes instruction stack linking control stack means.

9. An instruction fetch unit as defined in claim 7 in which the instruction stack linking control stack means includes no-go pointer stack means, even target pointer stack means, and odd target stack means for each instruction stored in the instruction stack means.

10. An instruction fetch unit as defined in claim 9 in which the instruction stack linking control stack means further includes TIP table hits stack means for recording the type code for each instruction stored in the instruction stack means.

11. A method for prefetching instructions for a central execution unit comprising the steps of:

storing an address of a pair of instructions in an instruction counter register;

incrementing the address of the pair of instructions stored in the instruction counter register to form an address of a next pair of instructions of a given instruction stream;

distributing the address of the next pair of instructions to a cache and to a transfer and indirect prediction table;

accessing the cache and the transfer and indirect prediction table to determine if a pair of instructions is in the cache and if TIP table words for the pair of addressed instructions are in the transfer and indirect prediction table;

selecting the addressed pair of addressed instructions from the cache and storing the selected instructions into an instruction fetch register;

obtaining the TIP table words for the selected instructions from the transfer and indirect prediction table and checking said TIP table words to determine if the selected instructions are transfer or indirect instructions and the target addresses thereof;

placing the pair of addressed instructions in an instruction stack;

loading into the instruction counter register the address stored in the TIP table word for transfer instructions recorded in the TIP table word as being a transfer or indirect instruction; and predicting which instruction in the instruction stack is the next instruction to be transferred to the central execution unit.

12. The method of claim 11 in which the address of the indirect instruction is loaded into the instruction register immediately after the address of the target indirect word is distributed.

13. The method of claim 12 in which if a transfer or indirect transfer instruction is wrongly predicted by the TIP table word, loading the address of the next sequential instruction of the current instruction stream into the instruction counter register.

14. The method of claim 13 including the further step of assuming in the absence of a TIP table word in the TIP table that neither of the addressed instructions is a trnsfer or an indirect instruction.

15. Method of prefetching instructions for a synchronous central processor having clock periods of a predetermined length of time and a central execution pipeline unit comprising the steps of:

(1) incrementing in the first stage contents of an instruction counter register and a backup instruction counter register to form a cache address of the next pair of instructions of a given stream of instruction, (2) distributing in the second stage the cache addresses stored in the instruction counter in stage 1 to cache means and TIP table directories, (3) accessing in the third stage a directory of the cache unit for the real page number (RPN) of the instruction pair and accessing the directory means of the TIP table to determine if TIP words have been written into a TIP table data array for either of the instructions of the instructions pair, (4) selecting during the fourth stage a pair of instructions from a level of the cache data array corresponding to the level of the cache directory specified in the cache address and storing the instructions so selected in the instruction fetch (IF) register and the RPN in an IRPN stack, (5) loading into the instruction stack during the fifth stage the instructions placed in the IF register during the fourth stage, examining the prediction codes of any TIP words read from the TIP table for the instructions loaded into the instruction stack to determine if they are transfer or indirect instructions, loading the cache address of the target word of the TIP word into the instruction counter register; however, if the instruction is an indirect instruction, the cache address of the target word is loaded only into the instruction counter register and not into the backup register and the address in the backup instruction counter register is loaded into the instruction counter register during the next clock period; and determining which next instruction is to be read out of the instruction stack by the central pipeline unit.

16. The method of claim 15 further including the steps of comparing the RPN of each instruction loaded into the instruction stack with the real page number of each instruction as determined by the central execution pipeline unit as each instruction is executed by the central execution pipeline unit.

17. The method of claim 16 further including the steps of canceling all instructions fetched subsequent to an instruction whose RPN's do not compare.

18. The method of claim 17 in which if a transfer or indirect instruction is wrongly predicted by its TIP table word, includes the step of loading the address of the next sequential instruction pair into the instruction counter register.

19. The method of claim 18 including the further step of assuming in the absence of a TIP table word in the TIP table that neither of the addressed instructions is a transfer or indirect instruction.

20. The method of claim 19 in which a plurality of instructions of the current instruction stream are prefetched after a transfer or indirect instruction is fetched before the target of such instruction is prefetched.

* * * * *